(12) United States Patent
Denton et al.

(10) Patent No.: US 7,966,214 B2
(45) Date of Patent: Jun. 21, 2011

(54) METHOD FOR CONSIDERING HIERARCHICAL PREEMPTIVE DEMAND PRIORITIES IN A SUPPLY CHAIN OPTIMIZATION MODEL

(75) Inventors: Brian T. Denton, Winooski, VT (US); John J. Forrest, Peekskill, NY (US); Robert J. Milne, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 1388 days.

(21) Appl. No.: 10/707,979

(22) Filed: Jan. 29, 2004

(65) Prior Publication Data

US 2005/0171828 A1     Aug. 4, 2005

(51) Int. Cl.
*G06F 9/46*     (2006.01)
(52) U.S. Cl. .......................................................... 705/8
(58) Field of Classification Search ....................... 705/8
See application file for complete search history.

(56) References Cited

U.S. PATENT DOCUMENTS

| | | | |
|---|---|---|---|
| 5,093,794 A * | 3/1992 | Howie et al. .................. | 700/100 |
| 5,233,533 A | 8/1993 | Edstrom et al. | |
| 5,943,484 A | 8/1999 | Milne et al. | |
| 5,971,585 A | 10/1999 | Dangat et al. | |
| 6,041,267 A | 3/2000 | Dangat et al. | |
| 6,088,626 A | 7/2000 | Lilly et al. | |
| 6,151,582 A * | 11/2000 | Huang et al. ....................... | 705/8 |
| 6,498,786 B1 * | 12/2002 | Kirkby et al. .................. | 370/322 |
| 6,701,201 B2 * | 3/2004 | Hegde et al. ................... | 700/107 |
| 6,898,472 B2 | 5/2005 | Crampton et al. | |
| 7,164,959 B2 | 1/2007 | Huang et al. | |

(Continued)

FOREIGN PATENT DOCUMENTS

EP     0 425 405 A2     5/1991

(Continued)

OTHER PUBLICATIONS de Farias, D. "The Linear Programming Approach Toapproximate Dynamic Programming: Theory and Application", dissertation, Stanford University, Jun. 2002.*

(Continued)

*Primary Examiner* — Romain Jeanty
*Assistant Examiner* — Mark A Fleischer
(74) *Attorney, Agent, or Firm* — Gibb I.P. Law Firm, LLC; Richard M. Kotulak, Esq.

(57) ABSTRACT

The invention comprises a method for achieving consideration of preemptive priorities within a supply chain optimization model. More specifically, the invention provides a method of allocating resources to a hierarchy of demand priorities in a linear programming production planning system. In particular, the invention aggregates the demand priorities into different priority groups and allocates the resources to the highest priority group of demand priorities using a first linear programming model. Next, the invention allocates remaining resources to the next highest priority group of demand priorities using a second linear programming model. The second linear programming model uses results from the first linear programming model. The invention continues this process by iteratively repeating the process of allocating remaining resources to the remaining groups of demand priorities, in order of priority. The system and method were employed to integrate the consideration of preemptive prioritization of customer demands with an advanced planning system for optimizing established planning objectives (e.g. customer service, short lead times, low inventory, and prioritized allocation of supply and capacity) to compute a feasible production plan for the division.

23 Claims, 6 Drawing Sheets

U.S. PATENT DOCUMENTS

| | | | |
|---|---|---|---|
| 7,197,469 B2* | 3/2007 | Hegde et al. | 705/8 |
| 7,464,147 B1* | 12/2008 | Fakhouri et al. | 709/223 |
| 2002/0133387 A1 | 9/2002 | Wilson et al. | |
| 2002/0188499 A1 | 12/2002 | Jenkins et al. | |
| 2002/0198757 A1 | 12/2002 | Hegde et al. | |
| 2003/0065415 A1 | 4/2003 | Hegde et al. | |
| 2003/0149631 A1 | 8/2003 | Crampton et al. | |
| 2003/0208392 A1* | 11/2003 | Shekar et al. | 705/8 |
| 2004/0030428 A1* | 2/2004 | Crampton et al. | 700/101 |
| 2005/0144056 A1 | 6/2005 | Wang et al. | |

FOREIGN PATENT DOCUMENTS

EP          0425405 A2      5/1991

OTHER PUBLICATIONS

Leachman, R. et al. "IMPReSS: An Automated Production-Planning fi and Delivery-Quotation System at Harris Corporation-Semiconductor Sector", Interfaces vol. 26, No. 1, 1996.* de Farias, D. "The Linear Programming Approach Toapproximate Dynamic Programming: Theory and Application", dissertation, Stanford University, Jun. 2002.*

Leachman, R. et al. "IMPReSS: An Automated Production-Planning fi and Delivery-Quotation System at Harris Corporation-Semiconductor Sector", Interfaces vol. 26, No. 1, 1996.* de Farias, D., Van Roy, B. "The Linear Programming Approach to Approximate Dynamic Programming". Operations Research, vol. 51, No. 6, Nov.-Dec. 2003, pp. 850-865.* de Farias, D. "The Linear Programming Approach Toapproximate Dynamic Programming: Theory and Application", dissertation, Stanford University, Jun. 2002.*

Leachman, R. et al. "IMPReSS: An Automated Production-Planning fi and Delivery-Quotation System at Harris Corporation-Semiconductor Sector", Interfaces vol. 26, No. 1, 1996.* de Farias, D., Van Roy, B. "The Linear Programming Approach to Approximate Dynamic Programming". Operations Research, vol. 51, No. 6, Nov.-Dec. 2003, pp. 850-865.*

Yi-Feng Hung and Robert C. Leachman, "A Production Planning Methodology for Semiconductor Manufacturing Based on Iterative Simulation and Linear Programming Calculations", IEEE Transactions on Semiconductor Manufacturing, vol. 9, No. 2, May 1996.*

Nagen Nagarur, Prem Vratb, Wanchai Duongsuwarf "Production planning and scheduling for injection moulding of pipe fittings a case study", Int. J. Production Economics 53 (1997) 157-170.*

Peter Lyon, et al. "Matching Assets with Demand in Supply-Chain Management at IBM Microelectronics", Interfaces 31: Jan.-Feb. 1, 2001 (pp. 108-124).* de Farias, D. "The Linear Programming Approach Toapproximate Dynamic Programming: Theory and Application", dissertation, Stanford University, Jun. 2002.*

Leachman, R. et al. "IMPReSS: An Automated Production-Planning fi and Delivery-Quotation System at Harris Corporation-Semiconductor Sector", Interfaces vol. 26, No. 1, 1996.*

Yi-Feng Hung and Robert C. Leachman, "A Production Planning Methodology for Semiconductor Manufacturing Based on Iterative Simulation and Linear Programming Calculations", IEEE Transactions on Semiconductor Manufacturing, vol. 9, No. 2, May 1996.*

Nagen Nagarur, Prem Vratb, Wanchai Duongsuwarf "Production planning and scheduling for injection moulding of pipe fittings a case study", Int. J. Production Economics 53 (1997) 157-170.*

Wang et al., "Earliness/Tardiness Production Planning Approaches with Due-Window for Manufacturing Systems." Computers in Industrial Engineering, 34:4 (1998), pp. 825-836.

Fang et al. "A Rolling Horizon Job Shop Rescheduling Strategy in the Dynamic Environment." International Journal of Advances Manufacturing Technology, 13 (1997), pp. 227-232.

Potts et al., "Single Machine Scheduling to Minimize Total Late Work." Operations Research, 40:3 (1992), pp. 586-595.

Wang et al., "JIT Production Planning Approach with Fuzzy Due Date for OKP Manufacturing systems." International Journal of Production Economics, 58 (1999), pp. 209-215.

Denton et al. U.S. Appl. No. 10/707,974, Office Action Communication, Jan. 22, 2009, 13 pages.

Moodie, D., "Demand Management: The Evaluation of Price and Due Date Negotiation Strategies Using Simulation," Production and Operations Management, vol. 8, No. 2, Summer 1999, pp. 151-162.

Denton et al., U.S. Appl. No. 10/707,977, Office Action Communication, Mar. 18, 2009, 10 Pages.

Karabuk, et al. "Coordinating Strategic Capacity Planning in the Semiconductor Industry". Operations Research, vol. 51, No. 6, Nov.-Dec. 2003, pp. 839-849.

Chen, H. et al., "A Lagrangian Relaxation Approach for Supply Chain Planning with Order/Setup Costs and Capacity Constraints". Journal of Systems Science and Systems Engineering, vol. 12, No. 1, pp. 98-110, Mar. 2003.

Chu, S. "A Mathematical Programing Approach Towards Optimized Master Production Scheduling", Int'l J. Of Production Economics, vol. 38, pp. 269-279.

Eksioglu, S. "Optimizing Integrated Production, Inventory and Distribution Problems in Supply Chains". A Dissertation, University of Florida, 2002.

George B. Dantzig, G.B., et al. "Decomposition Principle for Linear Programs", Operations Research, vol. 8, No. 1 (Jan. -Feb. 1960), pp. 101-111.

Denton et al., U.S. Appl. No. 10/707,974, Office Action Communication, Jul. 20, 2009, 9 pages.

Kern et al., "Master Production Rescheduling Policy in Capacity-Constrained Just-In-Time Make-To-Stock Environments", Decision Sciences, Spring 1996, vol. 27, Issue 2, ABI/INFORM Global, p. 365-387.

Denton et al., U.S. Appl. No. 10/707,977, Office Action Communication, Nov. 18, 2009, 17 pages.

Denton et al., U.S. Appl. No. 10/707,974, Office Action Communication, Mar. 4, 2010, 10 pages.

Denton et al., U.S. Appl. No. 12/125,193, Office Action Communication, Feb. 9, 2010, 24 pages.

Denton et al., U.S. Appl. No. 12/434,733, Notice of Allowance, Apr. 12, 2010, 9 pages.

Chen et al., "Quantity and Due Date Quoting Available to Promise," Information Systems Frontiers, vol. 3, Issue 4, pp. 477-488, 2001.

Wang et al., "Soft Computing for Multicustomer Due-Date Bargaining," IEEE Transactions on Systems, Man and Cybernetics Part C: Applications and Reviews, vol. 26, No. 4, Nov. 1999.

Hegedus et al., "Due Date Setting with Supply Constraints in Systems Using MRP," Computers & Industrial Engineering 39, pp. 293-305, 2001.

Denton et al., U.S. Appl. No. 12/125,193, Office Action Communication, Jul. 23, 2010, 8 pages.

Denton et al., U.S. Appl. No. 12/765,054, Office Action Communication, Jan. 5, 2011, 6 pages.

Wang et al., "Earliness/Tardiness Production Planning Approaches for Manufacturing Systems," 28 Computers and Industrial Engineering 425-436, 1995.

Denton et al., U.S. Appl. No. 12/125,193, Notice of Allowance Communication, Dec. 15, 2010, 7 pages.

Denton et al., U.S. Appl. No. 10/707,974, Office Action Communication, Sep. 15, 2010, 10 pages.

Leachman et al. "Impress: An Automated Production-Planning and Delivery-Quotation System at Harris Corporation-Semiconductorector", Interfaces vol. 26:1, pp. 6-37, 1996.

Nemhauser et al., "Integer and Combinatorial Optimization", Chapter 2—Linear Programmig, pp. 27-41, 1999.

G. Dantzig, "Linear Programmign and Extensions", Princeton University Press, pp. 448-455, 1963.

* cited by examiner

METHOD FOR CONSIDERING HIERARCHICAL PREEMPTIVE DEMAND PRIORITIES IN A SUPPLY CHAIN OPTIMIZATION MODEL

CROSS REFERENCE TO RELATED APPLICATIONS

The present application is related to pending U.S. patent application Ser. No. 10/707,978, filed concurrently herewith to Denton et al., entitled "A METHOD FOR SUPPLY CHAIN COMPRESSION" having (IBM); U.S. patent application Ser. No. 10/707,974, filed concurrently herewith to Denton et al., entitled "METHOD FOR PURCHASE ORDER RESCHEDULING IN A LINEAR PROGRAM" having (IBM); U.S. patent application Ser. No. 10/707,977, filed concurrently herewith to Denton et al., entitled "A METHOD FOR SUPPLY CHAIN DECOMPOSITION" having (IBM); U.S. patent application Ser. No. 10/707,976, tiled concurrently herewith to Denton et al., entitled "A METHOD FOR OPTIMIZING FOUNDRY .CAPACITY" having (IBM); U.S. patent application Ser. No. 10/707,972, filed concurrently herewith to Denton et a:., entitled "METHOD FOR FAIR SHARING LIMITED RESOURCES BETWEEN MULTIPLE CUSTOMERS" having (IBM); U.S. patent application Ser. No. 10/707,973, filed concurrently herewith to Denton et al., entitled "METHOD FOR SIMULTANEOUSLY CONSIDERING CUSTOMER COMMIT DATES AND CUSTOMER REQUEST DATES" having (IBM); and U.S. patent application Ser. No. 10/708, 119, filed concurrently herewith to Orzell et al., entitled "METHOD FOR IDENTIFYING PRODUCT ASSETS IN A SUPPLY CHAIN USED TO SATISFY MULTIPLE CUSTOMER DEMANDS". The foregoing applications arc assigned to the present assignee, and are all incorporated herein by reference.

BACKGROUND OF INVENTION

1. Field of the Invention

The present invention relates to computer implementable decision support systems for determining solutions to supply chain optimization problems in which customer demands have associated preemptive priorities to denote the relative importance of satisfying the demand. General methodologies within this field of study include advanced planning systems, optimization and heuristic based algorithms, constraint based programming, and simulation.

2. Description of the Related Art

A fundamental problem faced in all manufacturing industries is the allocation of material and capacity assets to meet end customer demand. Production lead times necessitate the advance planning of production starts, interplant shipments, and material substitutions throughout the supply chain so that these decisions are coordinated with the end customers" demand for any of a wide range of finished products (typically on the order of thousands in semiconductor manufacturing). Such advance planning depends upon the availability of finite resources which include: finished goods inventory, work in process inventory (WIP) at various stages of the manufacturing system, and work-center capacity. Often, there are alternative possibilities for satisfying the demand. Products may be built at alternative locations and within a location there may be choices as to which materials or capacity to use to build the product. The product may be built directly or acquired through material substitution or purchase. When limited resources prevent the satisfaction of all demands, decisions need to be made as to which demand to satisfy and how to satisfy it. This resource allocation problem is often addressed through linear programming.

The below-referenced U.S. Patents disclose embodiments that were satisfactory for the purposes for which they were intended. The disclosures of both the below-referenced prior U.S. Patents, in their entireties, are hereby expressly incorporated by reference into the present invention for purposes including, but not limited to, indicating the background of the present invention and illustrating the state of the art: U.S. Pat. No. 5,971,585, "Best can do matching of assets with demand in microelectronics manufacturing," Oct. 26, 1999; U.S. Pat. No. 5,943,484, "Advanced material requirements planning in microelectronics manufacturing," Aug. 24, 1999; and Nemhauser, G. L. and Wolsey, L. A., 1999, Wiley, *Integer and Combinatorial Optimization*. Also incorporated for reference into the present invention for purposes including, but not limited to, indicating the background of the present invention and illustrating the state of the art: (Leachman, R. C., R. F. Benson, C. Liu, D. J. Raar. 1996. IMPReSS: An automated production-planning and delivery-quotation system at Harris Corporation-semiconductor sector. *Interfaces* 26(1) 637.)

SUMMARY OF INVENTION

The invention provides a method and system for determining a production plan that allocates resources to different demands having priorities by iteratively solving mathematical linear programs. Each mathematical linear program optimizes according to one of a plurality of sets of priorities and each iterative solution is consistent with the previous set of priorities. These priorities are hierarchical and comprise two or more levels of hierarchy.

Backorder costs penalties are determined independently for each set of priorities and comprise a full spectrum range within each set of priorities. The mathematical linear programs solved in each iteration use the solution to the previous mathematical linear program as a starting point. The invention also adds constraints to the mathematical linear programs at each iteration to ensure that solutions to subsequent iterations are consistent with previous priorities. This method uses a different mathematical linear program for each iteration. The invention solves the mathematical linear programs for higher priorities before solving for lower priorities.

More specifically, the invention provides a method of allocating resources to a hierarchy of demand priorities in a linear programming production planning system. In particular, the invention aggregates the demand priorities into different priority groups and allocates the resources to the highest priority group of demand priorities using a first linear programming model. Next, the invention allocates remaining resources to the next highest priority group of demand priorities using a second linear programming model. The second linear programming model uses results from the first linear programming model. The invention continues this process by iteratively repeating the process of allocating remaining resources to the remaining groups of demand priorities, in order of priority.

When repeating the process of allocating remaining resources, the method uses a different linear programming model for each iteration and each different linear programming model uses results of the previous linear programming model. During the allocating processes, each linear programming model fixes variables for all demand priorities except for demand priorities of the priority group to which the resources are currently being allocated. Also, during the allocating processes, each linear programming model allocates the range of backorder costs within the priority group to which the resources are currently being allocated. The invention can also divide the priority groups into different sub-priority tiers. These sub-priority tiers can be processed simultaneously or separately.

The present invention is a hybrid method which handles hierarchical demand priorities via demand class aggregation and subsequent demand tier disaggregation. The inventive approach is based on aggregating demand priorities into groups, in which each group corresponds to an LP run. The invention generates backorder cost penalties associated with demand priorities within a group to model the consideration of multiple demand classes within a demand class group in the LP model. Further, the invention method iteratively modifies and solves the respective LPs in memory and leverages the results from one solution to the next.

The inventive method results in substantial computational savings over conventional systems while at the same time respecting demand classes throughout the supply chain. The invention solves relaxed (e.g., modified) versions of the LP model at each iteration that allow for flexibility in realigning resources (e.g. work-center capacity) to accommodate lower priority groups without sacrificing higher priority groups. Further, the invention can be applied to hierarchical demand priorities by selectively disaggregating demand tiers associated with demand classes.

DETAILED DESCRIPTION

Many factors are used to determine the relative importance of the variety of customer demands that are serviced by a manufacturing firm (e.g. gross margin, strategic importance, forecast vs. committed orders, demand mix considerations etc.). Typically, the implementation of supply-chain planning methods requires that these be translated into a "demand priority" (e.g. 1, 2, 3, . . . ) so that the many customer demands (measured in tens of thousands for division central runs) can be rank ordered according to importance. It is necessary to model this relative importance of demands when trading off the allocation of limited resources. For instance, photolithography tools are typically a production bottleneck in semiconductor manufacturing. When insufficient capacity exists to schedule production for all demands it is expected that work-in-process (WIP) inventory associated with higher priority demands will be processed before competing lower priority WIP.

Figure 4:
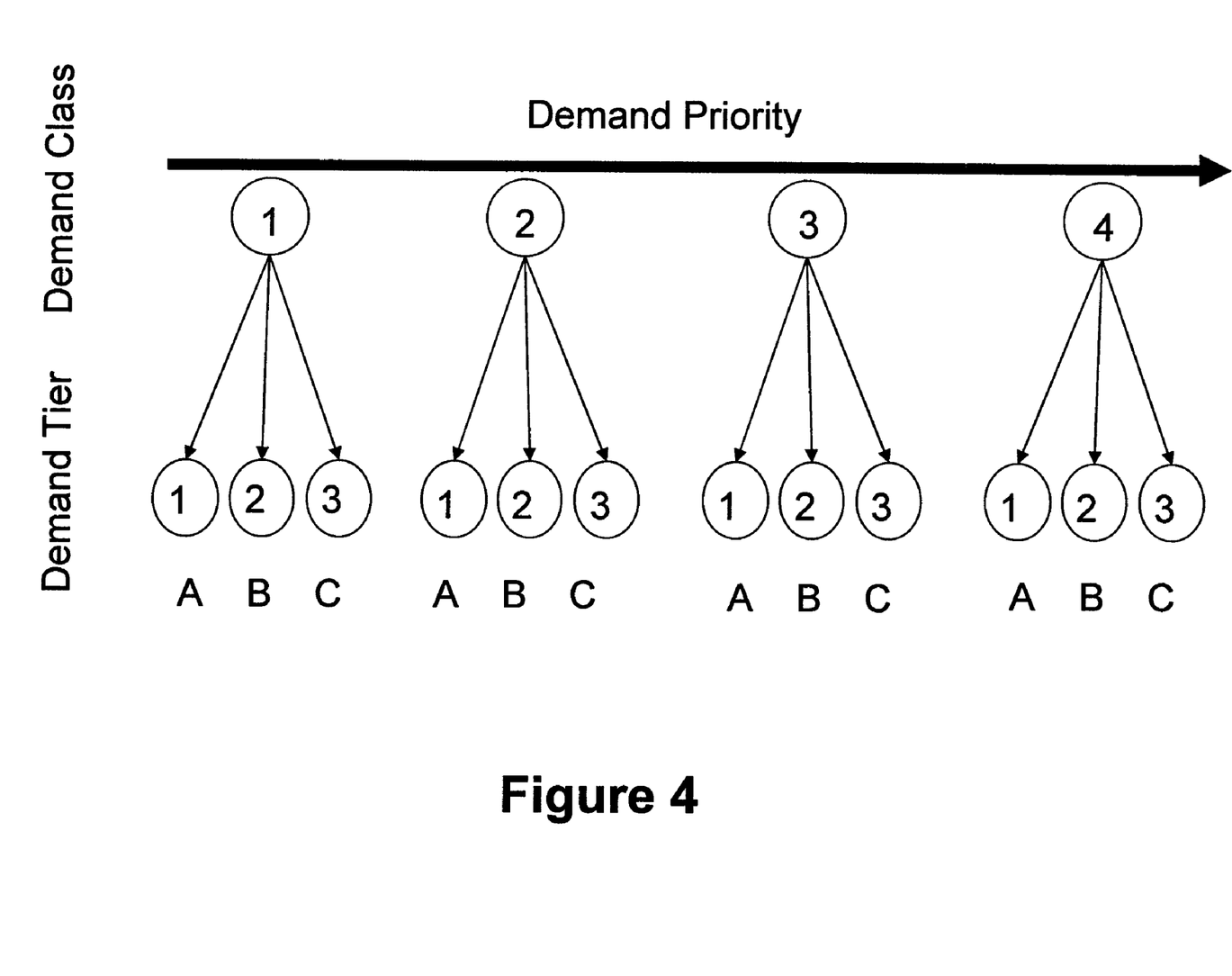
FIG. 4: Illustration of hierarchical demand priority based on demand class and demand tier.

It is important to break out the demand priority into a hierarchical set of attributes. For instance, it is common for a manufacturing firm to have two attributes a) demand class and b) demand tier which are used to determine the ultimate demand priority. FIG. 4 illustrates this hierarchical structure with an example in which there are four demand classes and each of the demand classes has three associated tiers. Thus, demand class is the most important factor and, within a particular demand class, importance is dictated by demand tier. The significance of the hierarchical structure is to denote that demand class is the most important factor dictating priority while demand tier is secondary.

To contrast the present invention, a conventional production planning linear program "LP" is shown below (such as that described in U.S. Pat. No. 5,971,585, which is incorporated herein by reference). This LP makes decisions including: production starts, material substitutions, and shipments planned to customers, between manufacturing and distribution locations, and from vendor suppliers. A LP is composed of an objective function that defines a measure of the quality of a given solution, and a set of linear constraints. The types of equations used in production planning models are well know to those practiced in the art and include: (1) Material Balance Constraints, which ensure conservation of material flow through the network of stocking points comprising the supply chain.

(2) Capacity Constraints, which ensure that the capacity available for manufacturing activities is not exceeded.

(3) Backorder Conservation Constraints, which balance the quantity of a given part backordered in a given planning period with the quantity backordered in the previous planning period and the net of new demand and new shipments.

(4) Sourcing Constraints, which define target ranges (minimum and maximum) of shipments that should be made from a particular manufacturing or vendor location in the supply chain.

A conventional LP formulation is provided below in the form familiar to those practiced in the art; i.e., definition of subscripts, definition of objective function coefficients, definition of constants, definition of decision variables, LP formulation or equations.

Definition of Subscripts j—time period
m—material (part number)
a—plant location within the enterprise
n—material being substituted
z—group (which represents a family or collection of part numbers)
e—process (a method of purchasing or manufacturing a material at a plant)
v—receiving plant location
k—demand center (i.e., customer location) (Note: the set of customer locations is mutually exclusive from the set of plant locations)
q—demand class which indicates relative priority. The higher the numerical value of q the lower the relative priority.
w—resource capacity which could be a machine, labor hour, or other constraint
u represents a consumer location which refers to an internal plant, external demand center, or to a generic indicator meaning any plant/or demand center Definition of Objective Function Coefficients $PRC_{jmae}$—cost of releasing one piece of part m during period j at plant a using process e
$SUBC_{jmna}$—substitution cost per piece of part number n which is being substituted by part number m during period j at plant a
$TC_{jmav}$—transportation cost per piece of part number m leaving plant a during period j which are destined for plant v
$INVC_{jma}$—inventory cost of holding one piece of part number m at the end of period j at a particular plant a $DMAXC_{jzau}$—cost per piece of exceeding the maximum amount of shipments of group z parts from plant a to consuming location(s) u during period j $DMINC_{jzau}$—cost per piece of falling short of the minimum amount of shipments specified for group z parts from plant a to consuming location(s) u during period j $BOC_{jmkq}$—backorder cost of one piece of part m at the end of period j for class q demand at customer location k

Definition of Constants $DEMAND_{jmkq}$—demand requested during time period j for part number m at customer location k for demand class q $RECEIPT_{jma}$—quantity of projected wip and purchase order receipts for part number m expected to be received at plant a during time period j $CAPACITY_{jaw}$—Capacity of resource w available at plant a during period j to support production starts $CAPREQ_{jmaew}$—Capacity of resource w required for part number m at plant a for process e during period jQ $TYPER_{jmaen}$—quantity of component m needed per part number n during period j at plant a using process e $YIELD_{jmae}$—output of part number m per piece released or started at plant a during time period j using process e $SUBQTY_{jmna}$—quantity of part number m required to substitute for one piece of part number n at plant a during time period j $MAXPCT_{jzau}$—maximum percentage of total shipments of group z (collection of parts) leaving supplier a during period j to support consumption at consuming location(s) u $MINPCT_{jzau}$—minimum percentage of total shipments of group z (collection of parts) leaving supplier a during period j to support consumption at consuming location(s) u $CT_{jmae}$—Cycle time. The number of periods between the release and completion of part m jobs for releases made using process e at plant a during time period j $TT_{mav}$—transport time for part number m from plant a to plant v

Definition of LP Decision Variables $I_{jma}$—Inventory at the end of period j for part number m at a particular plant a $P_{jmae}$—Production starts of part m during period j at plant a using process e $L_{jmna}$—Quantity of part number n which is being substituted by part number m during period j at plant a $T_{jmav}$—Internal shipments of part number m leaving plant a during period j which are destined for plant v $F_{jmakq}$—Shipments of part number m leaving plant a during period j and satisfying class q demand at external customer k $B_{jmkq}$—Back orders of part m at the end of period j for class q demand at customer location k $H_{jzu}$—Total shipments of group z (z is a "collection" of parts) leaving suppliers during period j to support consumption at consuming location(s) u.

$S_{jzau}$—Amount by which total shipments of parts in z from plant a to consuming location(s) u during period j exceeds the maximum amount specified as desired in the sourcing rules $G_{jzau}$—Amount by which total shipments of group z parts from plant a to consuming location(s) u during period j falls short of the minimum amount specified as desired in the sourcing rules LP Equations or Formulation The following minimizes the objective function subject to the constraints shown below.

Objective Function:
Minimize:

$$\sum_j \sum_m \sum_a \sum_e PRC_{jmae} P_{jmae} +$$

$$\sum_j \sum_m \sum_n \sum_a SUBC_{jmna} L_{jmna} + \sum_j \sum_m \sum_a \sum_v TC_{jmav} T_{jmav} +$$

$$\sum_j \sum_m \sum_a INVC_{jma} I_{jma} + \sum_j \sum_z \sum_a \sum_u DMAXC_{jzau} S_{jzau} +$$

$$\sum_j \sum_z \sum_a \sum_u DMINC_{jzau} G_{jzau} + \sum_j \sum_m \sum_k \sum_q BOC_{jmkq} B_{jmkq}$$

Subject to:
Sourcing Constraints:

$$H_{jzu} = \sum_{\substack{m \\ \varepsilon z}} \sum_a \left( T_{jmau} + \sum_q F_{jmauq} \right)$$

$$\sum_{\substack{m \\ \varepsilon z}} \left( T_{jmau} + \sum_q F_{jmauq} \right) - S_{jzau} \leq MAXPCT_{jzau} H_{jzu}$$

$$\sum_{\substack{m \\ \varepsilon z}} \left( T_{jmau} + \sum_q F_{jmauq} \right) + G_{jzau} \geq MINPCT_{jzau} H_{jzu}$$

Capacity Constraints:

$$\sum_m \sum_e CAPREQ_{jmaew} P_{jmae} \leq CAPACITY_{jaw}$$

Backorder Constraints:

$$B_{jmkq} = B_{(j-1)mkq} + DEMAND_{jmkq} - \sum_a F_{jmakq}$$

Material Balance Constraints:

$$I_{jma} = I_{(j-1)ma} + RECEIPT_{jma} + \sum_{\substack{xsi,t \\ x+CT_{xmae}=j}} \sum_e YIELD_{xmae} * P_{xmae} +$$

$$\sum_n L_{jmna} + \sum_{\substack{xs,t \\ x+TT_{mav}=j}} \sum_v T_{xmva} - \sum_n SUBQTY_{jmna} * L_{jmna} -$$

$$\sum_v T_{jmav} - \sum_k \sum_q F_{jmakq} - \sum_{\substack{nst,m \\ \text{is a component} \\ \text{of } n}} \sum_e QTYPER_{jmaen} P_{jnae}$$

Non-Negativity Constraints:

all $X_{i,j...} \geq 0$, where X is a generic decision variable and i, j etc. represent generic subscripts Other approaches use a heuristic approach to schedule in which WIP is sequenced according to its pegged demand priority at the various work-centers throughout the supply chain. While this can be effective from the point of view of rigorously considering demand priorities, these heuristics typically fail to find globally optimal solutions. From the point of view of global optimization of resource allocation, linear programming (LP) is a superior approach. However, the LP approach relies on cost penalty weightings to "encourage" demand priority compliance and in practice demand priorities may be violated (e.g. a high yield low priority item may be favored over a low yield high priority item).

Figure 3:
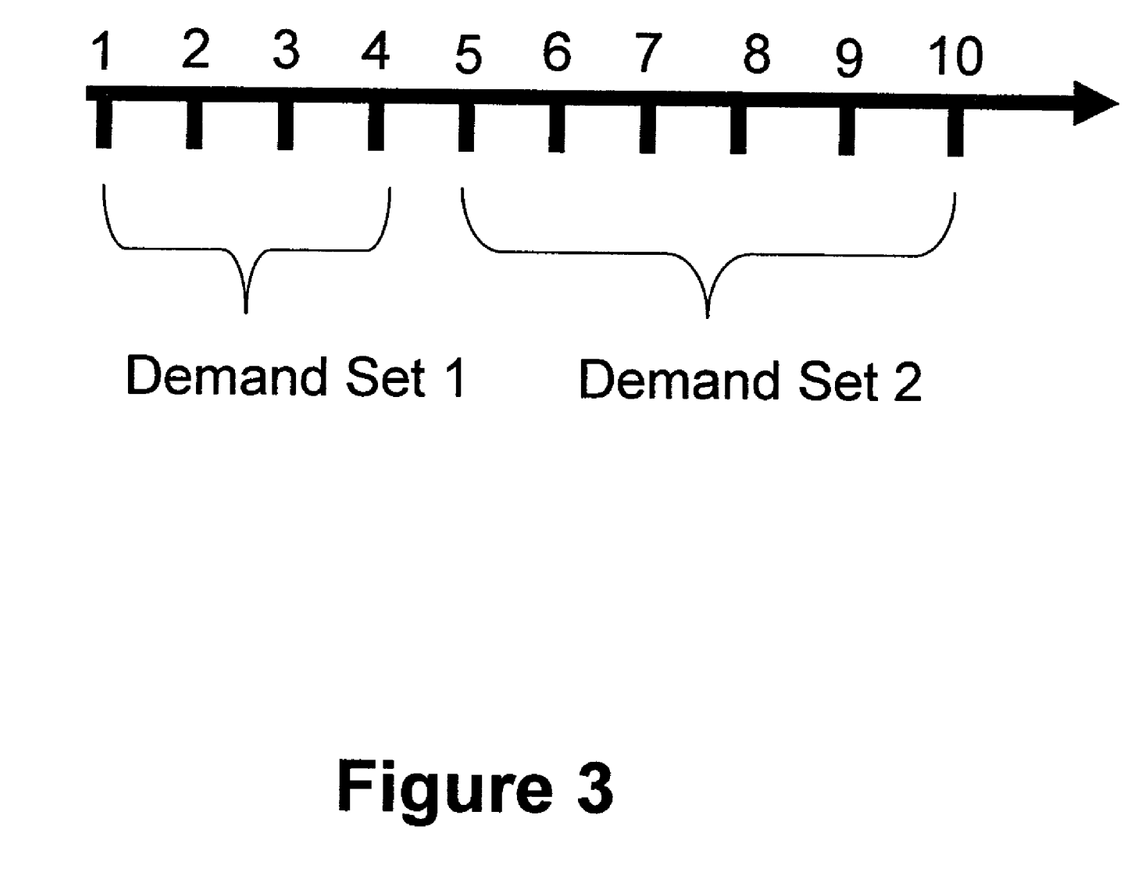
FIG. 3: Illustration of demand priority aggregation.

The Leachman method (Leachman, R. C., R. F. Benson, C. Liu, D. J. Raar. 1996. IMPReSS: An automated production-planning and delivery-quotation system at Harris Corporation-semiconductor sector. *Interfaces* 26(1) 637) incorporates the consideration of "preemptive" demand priorities into an LP modeling framework in which each LP corresponds to a single demand priority. However, this method can have severe disadvantages in terms of computational efficiency, and does not consider hierarchical demand prioritization The inventive approach, on the other hand, is a method based on aggregating demand priorities into groups, in which each group corresponds to an LP run. (FIG. 3 illustrates the grouping of priorities into sets.) Thus, the present invention is a hybrid method which handles hierarchical demand priorities via demand class aggregation and subsequent demand tier disaggregation. The invention generates backorder cost penalties associated with demand priorities within a group to model the consideration of multiple demand classes within a demand class group in the LP model. Further, the inventive method iteratively modifies and solves the respective LPs in memory and leverages the results from one solution to the next.

The inventive method results in substantial computational savings over conventional systems while at the same time respecting demand classes throughout the supply chain. The invention solves relaxed (e.g., modified) versions of the LP model at each iteration that allow for flexibility in realigning resources (e.g. work-center capacity) to accommodate lower priority groups without sacrificing higher priority groups. Further, the invention can be applied to hierarchical demand priorities by selectively disaggregating demand tiers associated with demand classes.

Ideally, the method used for modeling backorder costs would guarantee demand compliance for any number of demand priorities in a single LP run. In theory this could be done by setting the backorder penalty for a particular demand priority arbitrarily higher than the penalty for the next lower demand priority. However, in practice due to finite numerical accuracy of floating point operations there are bounds on the allowable range of objective function penalties (experimental evidence implies this is about 0.01 to 1,000,000 when operating with double precision using the 64 bit C/C++ compilation mode), and the delta between priorities which is recognizable. Therefore, with the invention backorder costs penalties are determined independently for each set (group) of priorities. Within each group of demand priorities, the backorder penalties comprise a full spectrum range of objective function penalties. Thus, each successive linear programming model allocates a full range of backorder costs within the priority group to which the resources are currently being allocated to avoid the foregoing problem.

Figure 1:
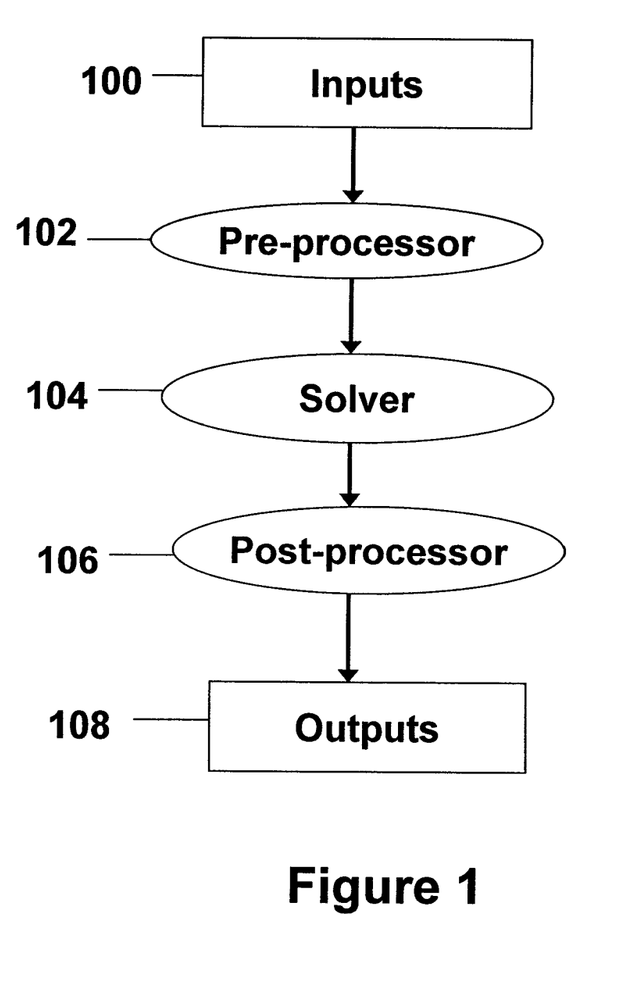
FIG. 1: Overview of the structure of a linear programming application.
Figure 2:
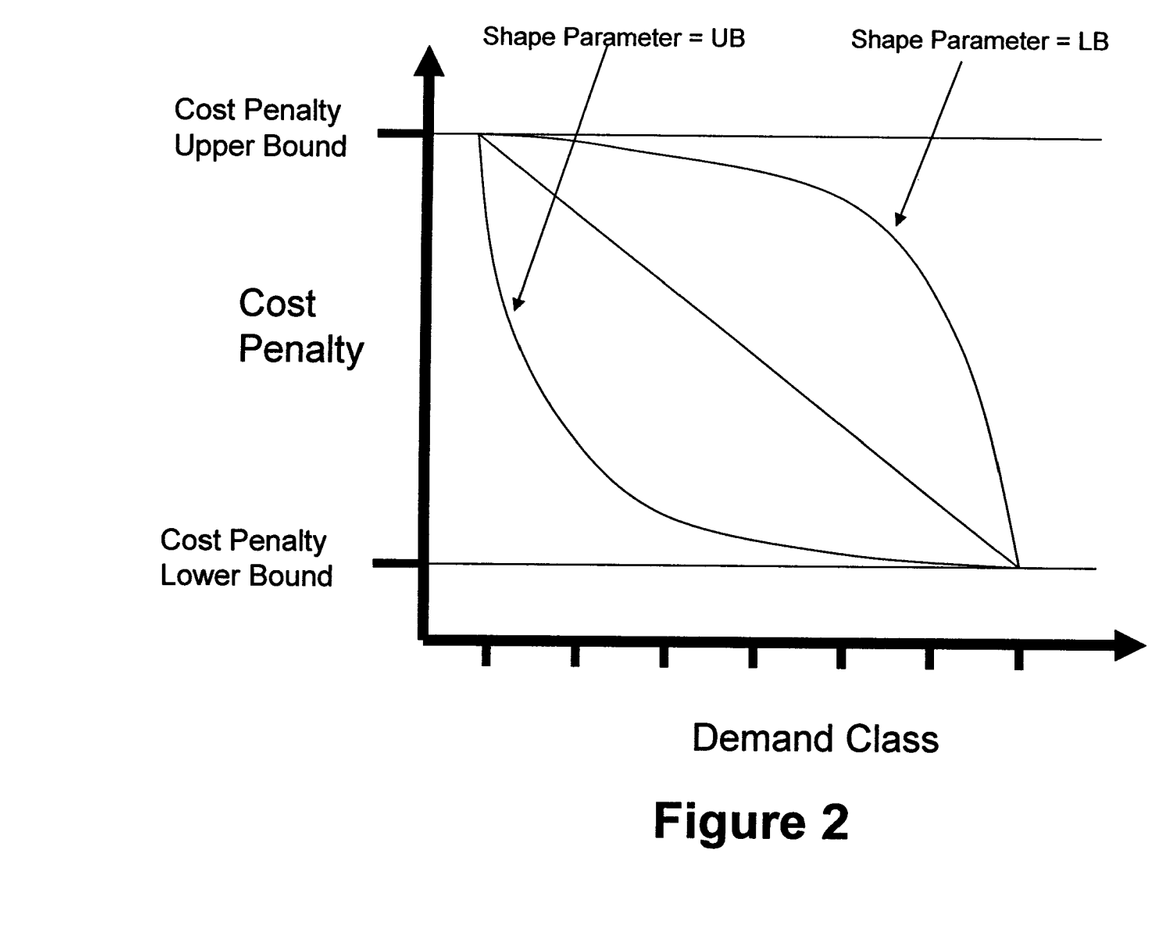
FIG. 2: Illustration of backorder coefficients within a priority group.

The numerical bounds on backorder cost penalties are illustrate in the example of FIG. 2 in which there are lower and upper bounds on the cost penalties based on a recursive set of mathematical equations described below. FIG. 2 further illustrates three possibilities for calibrating backorder costs from a continuous range of possibilities. In FIG. 2, the examples illustrate costs which are (a) decreasing at an increasing rate with respect to demand class (b) linearly decreasing in demand class and (c) decreasing at a decreasing rate with respect to demand class. The inventive modeling backorder costs is based on the following recursive equations $$\text{Delta}\_\{j+1\} = C * \text{Delta}\_\{j\}$$

where Delta is chosen, such that within each group of priority demands, the most and least important demand priority correspond to the maximum and minimum allowable backorder costs respectively. If there are N demand priorities in the group and we start with the initial condition that backorder cost $BC\_\{1\} = \max$ and model the costs as follows $$BC\_\{1\} = \text{MAX\_COST}$$

$$BC\_\{2\} = \text{Delta} * \text{MAX\_COST}$$

$$BC\_\{3\} = C * \text{Delta}^\{2\} * \text{MAX\_COST}$$

$$BC\_\{i\} = C^\{i-2\} * \text{Delta}^\{i-1\} * \text{MAX\_COST}$$

Since we require that $BC\_\{n\} = \text{MIN\_COST}$ it follows that $$\text{Delta} = (\text{MIN\_COST}/(c^\{(n-2)*(n-1)/2\} * \text{MAX\_COST}))^\{1/(n-1)\}$$

The parameter C is a shape parameter (defined by the user) that influences the relative difference between backorder costs from one demand priority to the next. Given the assumption that backorder costs should be decreasing in the importance of the demand priority the values C can take are in the following range $$\text{Lower Bound (LB)} = (\text{MIN\_COST}/\text{MAX\_COST})^\{2.0/((n-2)*(n-1))\}$$

$$\text{Upper Bound (UB)} = 1/\text{LB}$$

where LB and UB follow from the requirement that Delta<1 and C*Delta<1 respectively. Depending on the choice for C in the range [LB, UB] different relative differences between backorder costs are obtained. These differences are illustrated in FIG. 2. In the present implementation of the invention typically $C = LB + \frac{2}{3} * (UB - LB)$ is chosen to maximize the relative difference between backorder costs from one demand priority to the next with some preference (determined by the choice of C) given to the difference between more important demand priorities. As C approaches UB the preference for relative differences in demand priority is shifted from less important to more important demand classes.

Figure 5:
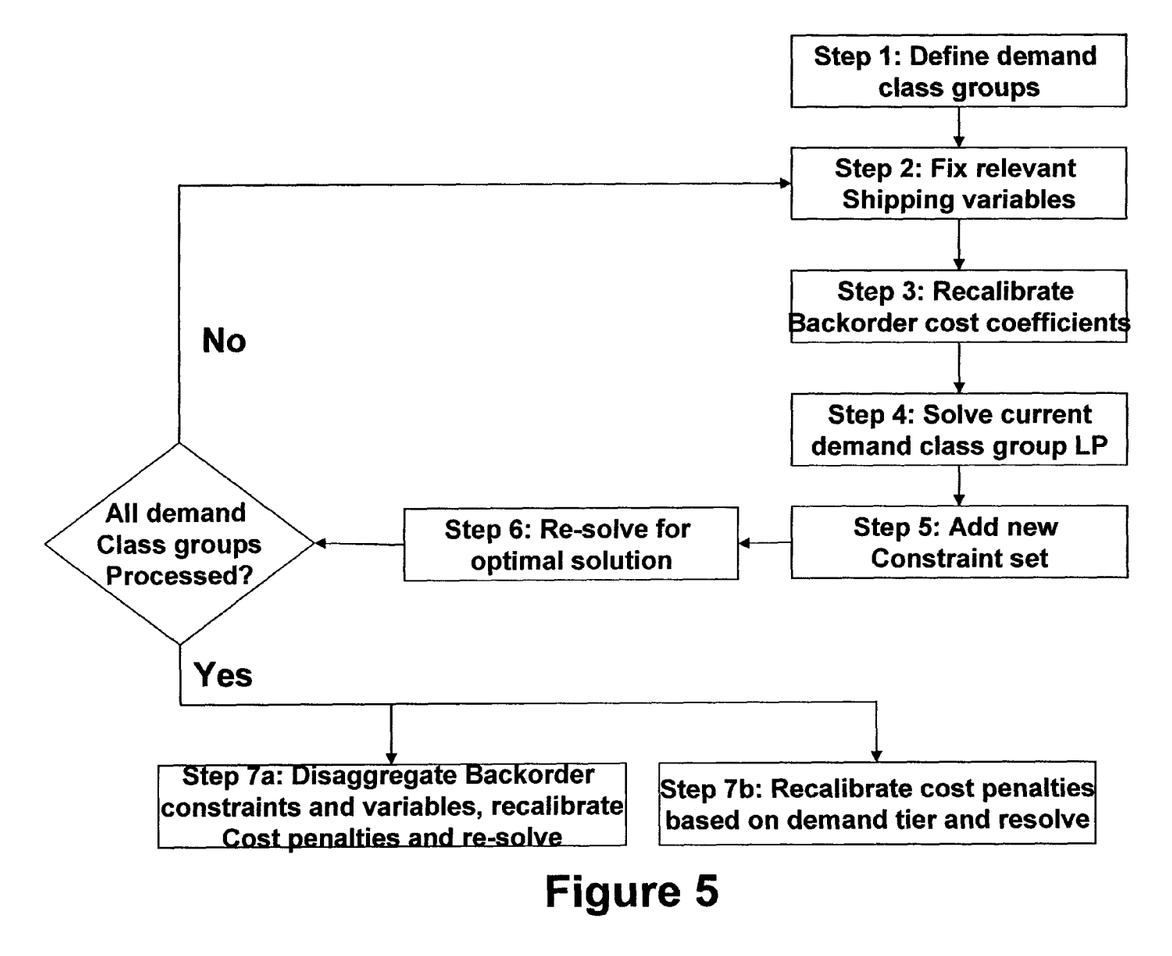
FIG. 5: Illustration of the steps of the method.

The following is a pseudo code description and corresponding flowchart shown in FIG. 5 illustrate an implementation of the above described idea. With the invention any commercial linear program solver could be employed.

Definitions $N(i)$=number of demand classes in group i
$M$=number of demand tiers per demand class
$n$=number of demand priority groups
$F\_\{m,j,a,k,q\}$=LP decision variable representing quantity of shipments of part m in period j from plant, a, to customer location, v, with priority q
$B\_\{m,j,k,q\}$=LP decision variable representing the quantity of part m to backorder in period j for customer k of priority q
$D\_\{m,j,k,q\}$=demand for part m in period j from customer k of priority q
BO=backorder constraints of the form $B\_\{m,j,k,q\} = B\_\{m,j-1,k,q\} + D\_\{m,j,k,q\} \text{Sum(over a)} F\_\{m,j,a,k,q\}$
$BC\_\{m,j,k,q\}$=LP cost penalty for backorder variable $B\_\{m,j,k,q\}$
MIN_COST=precision based lower bound on BC penalty
MAX_COST=precision based upper bound on BC penalty UB=upper bound
LB=lower bound Step 1: User defines a set of "demand class groups" from the set of demand classes. For example, 10 demand classes could be split into 2 groups [1, . . . 3] and [4, . . . , 10]. The groups are indexed from i=1, . . . n and the number of distinct demand classes in group i is N(i). Set i=1.

Step 2: Fix all $F\_\{m,j,a,k,q\}$ variables where demand class q is in a numerically higher (less important) priority group than group i and unfix all variables such that q is in a numerically lower (more important) priority group than i or equal priority as group i. Fixing and unfixing is done by setting variable_upper_bound=0.0 and variable_upper_bound=INFINITY respectively.

Step 3: Recalibrate cost penalties for variables, $B\_\{m,j,k,q\}$, with q in group i. This method is based on above discussion about maximizing the relative difference between each priority in group i subject to user defined cost shape parameters.

```
//Bounds on shape parameters
LB = (MIN_COST/MAX_COST)^{2.0/((N(i)-2)*(N(i)-1))}
UB = 1.0/lower_bound
//Convert user defined parameter, C, from [0,1] range to
[LB,UB]
Factor = C*LB + (1.0- C)*UB
//Compute relative cost difference factor
Delta=MIN_COST/(Factor^{(N(i)-2)*(N(i)-1)/2}*MAX_COST)
)^{1.0/(N(i)-1)})
//Compute penalties from deltas
Cost[0] = MAX_COST
for(j=1;j<N(j);j++) Cost[j] = factor^{j-1}*Delta*Cost[j-1]
//Set BC''s to computed cost penalties
For(all BC__{m,j,k,q} such that q an element of group i){
DP = relative group i demand priority for current
BC__{m,j,k,q}
BC__{m,j,k,q} = Cost[DP]
}
```

Step 4: Solve modified group i LP:
if(i==1) solve LP using normal OSL simplex LP method
else warm start LP solution using previous solution as an advanced basis Step 5: Add a new constraint set to the current LP model enforcing that $B\_\{m,j,k,q\}$ variables in group i are lower bounded based on the current LP solution from Step 4. These constraints have the form:

For a particular period, j, and demand class q: Sum(parts m, customer locations k) $B\_\{m,j,k,q\}$<=Sum(parts m, customer locations k) ($B\_\{m,j,k,q\}$ from Step 4)

Step 6: Reset the LP basis with current variables fixed using the dual simplex method. Increment group to i=i+1. If (i==n+1) go to step 7, otherwise go to step 2.

In the remaining description of the method we have two alternative embodiments which we represent as Step 7A and Step 7b:

Step 7a: For each demand class disaggregate BO constraints and associated variables into separate demand tiers. For example, the BO constraint $$B\_\{m,j,k,q\}=B\_\{m,j-1,k,q\}+D\_\{m,j,k,q\} \text{ Sum(over a)} F\_\{m,j,a,k,q\}$$

would become a set of constraints indexed by tier, t, as follows $$B\_\{m,j,k,q,t\}=B\_\{m,j-1,k,q,t\}+D\_\{m,j,k,q,t\} \text{ Sum (over a)} F\_\{m,j,a,k,q,t\}, \text{ for all } t=1,\ldots,M$$

Thus, the constraints added in Step 5 are disaggregated. The previous (aggregated) solution can be used to provide a feasible starting solution for reoptimizing the LP with the additional disaggregated constraints. For example, if there were two demand tiers then $F\_\{m,j,a,k,q1\}=D1*F\_\{m,j,a,k,q\}$ and $F\_\{m,j,a,k,q2\}=D2*F\_\{m,j,a,k,q\}$, where D1 and D2 represent the fraction of demand in period j that is in tier 1 and tier 2 respectively. Once the revised solution to the disaggregated LP is determined, the F and B variables for the current demand class are fixed to their current values, the next demand class is disaggregated, solved, and so on. This is carried our until all demand classes have been considered.

Step 7b: For each variable, $B\_\{m,j,k,q\}$, the invention recalculates penalties for all of the demand classes that reflects priority differences within a class. For example rather than add a new demand tier index, t, to variables, $B\_\{m,j,k,q\}$, instead the associated penalty would be a weighted average of the different demand tiers for customers, k, within class, q. A final run with these modified cost penalties results in a solution which: a) respects demand class priorities preemptively based on the constraints added in Step 5b) given the myriad of solutions respecting (a), this final solution will be one which tends to respect the differences in demand tierThe alternative Steps 7a and 7b allow for the ability to tradeoff different criteria. For instance, Step 7a is more accurate in the way that it applies demand priorities than Step 7b. On the other hand, Step 7b is likely to be computationally more efficient since it does not involve the disaggregation of variables and constraints that is done in Step 7a. FIG. 5 illustrates the flow of the above steps in the method.

Figure 6:
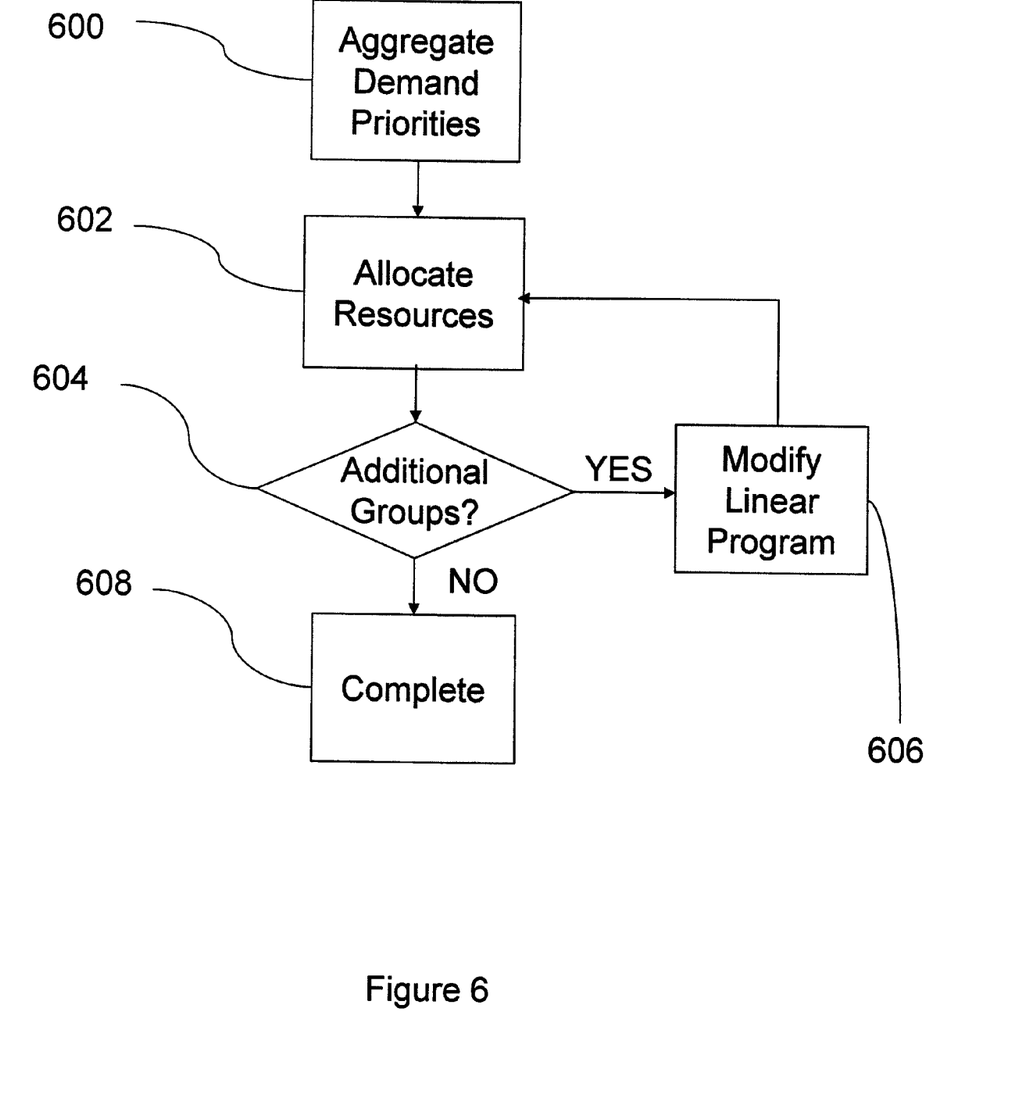
FIG. 6: Flowchart illustrating one embodiment of the invention.

FIG. 6 is a more general flowchart showing the operation of the invention. In item 600, the invention aggregates the demand priorities into different priority groups. In item 602, the invention allocates the resources to the highest priority group of demand priorities using a first linear programming model. Next, in decision block 604, the invention determines if there are additional groups of priority demands to process. If so, the invention modifies the linear program to create a second linear programming model as shown in item 606. Then processing returns to item 602 where the invention allocates remaining resources to the next highest priority group of demand priorities using a second linear programming model. The second linear programming model uses results from the first linear programming model. The invention continues this process by iteratively repeating the process of allocating remaining resources to the remaining groups of demand priorities in order of priority. After all groups are processed (or there are no resources remaining) this portion of the process is complete 608.

When repeating the process of allocating remaining resources, the method uses a different linear programming model for each iteration and each different linear programming model in item 606 uses results of the previous linear programming model. In each of the linear programming models created in item 606, the invention fixes variables associated with all demand priorities that are in lower priority (numerically higher) groups than the priority group to which the resources are currently being allocated. Also, each linear programming model in item 606 allocates the full range of backorder costs within the single priority group to which the resources are currently being allocated. Therefore, each iteration has the benefit of a full range of backorder costs. The invention can also divide the priority groups into different sub-priority tiers. These sub-priority tiers can be processed simultaneously or separately.

The present invention has been implemented on an IBM P690 server using the AIX operating system. The steps for implementing the present invention are preferably programmed in C/C++. It should be understood by those of ordinary skill in the art, however, that the represent invention is not limited to the above implementation and is independent of the computer/system architecture. Accordingly, the present invention may equally be implemented on other computing platforms, programming languages and operating systems, and also may be hard-wired into a circuit or other computational component.

The present invention is a hybrid method which handles hierarchical demand priorities via demand class aggregation and subsequent demand tier disaggregation. The inventive approach is based on aggregating demand priorities into groups, in which each group corresponds to an LP run. The invention generates backorder cost penalties associated with demand priorities within a group to model the consideration of multiple demand classes within a demand class group in the LP model. Further, the invention method iteratively modifies and solves the respective LPs in memory and leverages the results from one solution to the next.

The inventive method results in substantial computational savings over conventional systems while at the same time respecting demand classes throughout the supply chain. The invention solves relaxed (e.g., modified) versions of the LP model at each iteration that allow for flexibility in realigning resources (e.g. work-center capacity) to accommodate lower priority groups without sacrificing higher priority groups. Further, the invention can be applied to hierarchical demand priorities by selectively disaggregating demand tiers associated with demand classes.

While the invention has been described in terms of the preferred embodiments, those skilled in the art will recognize that the invention can be practiced with modification within the spirit and scope of the appended claims.

The invention claimed is:

1. A computer-implemented method for determining a production plan comprising:
   receiving customer demands for resources from different customers;
   rank ordering, by a computing device, said customer demands to create prioritized customer demands;
   aggregating, by said computing device, said prioritized customer demands into a plurality of priority groups based on said rank ordering of said customer demands;
   optimizing, by said computing device, a first mathematical linear programming model based on processing a highest priority group of said plurality of priority groups;
   assigning, by said computing device, a portion of said resources to said highest priority group of said plurality of priority groups based on said optimizing said first mathematical linear programming model;
   determining, by said computing device, each iterative solution for remaining ones of said plurality of priority groups in order of said rank ordering of said customer demands using results from a previous mathematical linear programming model solution;
   assigning, by said computing device, portions of remaining resources to a next highest priority group of said plurality of priority groups based on said determining each iterative solution;
   outputting, by said computing device, said production plan based on said assigning resources;
   independently determining, by said computing device, backorder costs penalties for each of said plurality of priority groups using said computing device; and
   assigning, by said computing device, by each successive mathematical linear programming model, a range of said backorder costs within a priority group of said plurality of priority groups to which resources are currently being assigned.

2. The method of claim 1, wherein said prioritized customer demands are hierarchical and comprises two or more levels of hierarchy.

3. The method of claim 1, wherein said mathematical linear programs solved in each iteration use the solution to the previous mathematical linear program as a starting solution.

4. The method of claim 1, further comprising adding constraints to said mathematical linear programming models at each iteration ensure a feasible starting solution for re-optimizing said mathematical linear programming models.

5. The method of claim 1, wherein said method uses a different mathematical linear program for each iteration.

6. The method of claim 1, wherein said assigning process solves said mathematical linear programs for higher prioritized customer demands before solving said mathematical linear programs for lower prioritized customer demands.

7. A computer-implemented method of assigning resources to a hierarchy of prioritized customer demands in a linear programming production planning system for determining a production plan, said method comprising:
   receiving customer demands for resources from different customers;
   rank ordering, by a computing device, said customer demands to create prioritized customer demands;
   aggregating, by said computing device, said prioritized customer demands into a plurality of priority groups based on said rank ordering of said customer demands;
   optimizing, by said computing device, a first mathematical linear programming model based on processing a highest priority group of said plurality of priority groups;
   assigning, by said computing device, a portion of said resources to a highest priority group of said plurality of priority groups based on said optimizing said first linear programming model;
   assigning, by said computing device, portions of remaining resources to a next highest priority group of said plurality of priority groups using a second mathematical linear programming model, wherein said second mathematical linear programming model uses results from said first mathematical linear programming model;
   repeating said process of assigning portions of remaining resources, by said computing device, to remaining groups of said plurality of priority groups in order of priority, wherein each subsequent mathematical linear programming model uses results from a previous linear programming model; and
   outputting, by said computing device, a production plan based said assigning resources,
   wherein during said assigning processes, each mathematical linear programming model assigns a range of backorder costs within the priority group of said plurality of priority groups to which the resources are currently being assigned.

8. The method in claim 7, wherein when repeating said process of assigning remaining resources, said method uses a different linear programming model for each repetition of said process of assigning remaining resources.

9. The method in claim 8, wherein each different linear programming model uses a program solution of the previous linear programming model.

10. The method in claim 7, wherein during said assigning processes, each linear programming model fixes variables associated with priority groups that have a lower priority than the priority group to which the resources are currently being assigned.

11. The method in claim 7, further comprising dividing said priority groups into different sub-priority tiers.

12. The method in claim 11, wherein said sub-priority tiers can be processed simultaneously.

13. A computer-implemented method of assigning resources to a hierarchy of prioritized customer demands in a linear programming production planning system for determining a production plan, said method comprising:
receiving customer demands for resources from different customers;
rank ordering, by a computing device, said customer demands to create prioritized customer demands;
aggregating, by said computing device, said prioritized customer demands into a plurality of priority groups based on said rank ordering of said customer demands;
optimizing, by said computing device, a first mathematical linear programming model based on processing a highest priority group of said plurality of priority groups;
assigning, by said computing device, a portion of said resources to a highest priority group of said plurality of priority groups based on said optimizing said first linear programming model;
assigning, by said computing device, portions of remaining resources to a next highest priority group of said plurality of priority groups using a second mathematical linear programming model, wherein said second mathematical linear programming model uses results from said first mathematical linear programming model;
repeating said process of assigning portions of remaining resources, by said computing device, to remaining groups of said plurality of priority groups in order of priority using a different mathematical linear programming model for each iteration, wherein each subsequent mathematical linear programming model uses results from a previous linear programming model; and
outputting, by said computing device, a production plan based said assigning resources,
wherein during said assigning processes, each mathematical linear programming model assigns a range of backorder costs within the priority group of said plurality of priority groups to which the resources are currently being assigned.

14. The method in claim 13, wherein each different linear programming model uses a program solution of the previous linear programming model.

15. The method in claim 13, wherein during said assigning processes, each linear programming model fixes variables associated with priority groups that have a lower priority than priority group to which the resources are currently being assigned.

16. The method in claim 13, further comprising dividing said priority groups into different sub-priority tiers.

17. The method in claim 16, wherein said sub-priority tiers can be processed simultaneously.

18. A program storage device readable by machine, tangibly embodying a program of instructions executable by the machine to perform a method of assigning resources to a hierarchy of prioritized customer demands in a linear programming production planning system for determining a production plan, said method comprising:
receiving customer demands for resources from different customers;
rank ordering said customer demands to create prioritized customer demands;
aggregating said prioritized customer demands into a plurality of priority groups based on said rank ordering of said customer demands;
optimizing a first mathematical linear programming model based on processing a highest priority group of said plurality of priority groups;
assigning a portion of said resources to a highest priority group of said plurality of priority groups based on said optimizing said first linear programming model;
assigning portions of remaining resources to a next highest priority group of said plurality of priority groups using a second mathematical linear programming model, wherein said second mathematical linear programming model uses results from said first mathematical linear programming model; repeating said process of assigning portions of remaining resources to remaining groups of said plurality of priority groups in order of priority, wherein each subsequent mathematical linear programming model uses results from a previous linear programming model; and
outputting, by said computing device, a production plan based said assigning resources,
wherein during said assigning processes, each mathematical linear programming model assigns a range of backorder costs within the priority group to of said plurality of priority groups which the resources are currently being assigned.

19. The program storage device in claim 18, wherein when repeating said process of assigning remaining resources, said method uses a different linear programming model for each iteration.

20. The program storage device in claim 19, wherein each different linear programming model uses a program solution of the previous linear programming model.

21. The program storage device in claim 18, wherein during said assigning processes, each linear programming model fixes variables associated with priority groups that have a lower priority than the priority group to which the resources are currently being assigned.

22. The program storage device in claim 18, wherein said method further comprises dividing said priority groups into different sub-priority tiers.

23. The program storage device in claim 22, wherein said sub— priority tiers can be processed simultaneously.

* * * * *